3,134,760
WATER-SOLUBLE REACTIVE DISAZO DYESTUFFS

August Schweizer, Muttenz, and Hanspeter Uehlinger, Basel, Switzerland, assignors to Sandoz Ltd., Basel, Switzerland
No Drawing. Filed Mar. 2, 1961, Ser No. 92,783
Claims priority, application Switzerland Mar. 4, 1960
6 Claims. (Cl. 260—146)

The present invention relates to reactive metallizable disazo dyestuffs of the formula

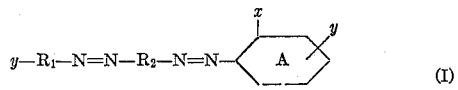

(I)

and their chromium and cobalt complex compounds, wherein $R_1$ represents a radical of the benzene, diphenyl or naphthalene series, $R_2$ represents a radical of the benzene or naphthalene series, coupled twice, in both cases in ortho position to hydroxy groups and/or amino groups, which latter may be monosubstituted, $x$ represents a substituent capable of metal complex formation, One $y$ represents hydrogen or a group containing at least one radical of the formula

wherein Hal stands for chlorine or bromine, and the other $y$ represents a group containing at least one radical of the formula

wherein Hal stands for chlorine or bromine, and wherein $R_1$, $R_2$ and the nucleus A together contain the number of solubilizing groups necessary for water-solubility and further substituents if desired.

The process for the production of the new disazo dyestuffs consists in coupling in either order 1 mol of the diazo compound of an aromatic amine of the benzene, diphenyl or naphthalene series and 1 mol of the diazo compound of an aminobenzene which contains in ortho position to the amino group a group capable of metal complex formation and may also contain further substituents, with 1 mol of a coupling component of the benzene or naphthalene series which contains two carbon atoms capable of coupling in ortho position to hydroxy groups and/or amino groups, which latter may be monosubstituted, upon which the disazo dyestuff obtained, which must contain at least one group introduced before, during or after the reaction and bearing at least one radical of the formula

wherein Hal stands for chlorine or bromine, plus at least the number of solubilizing groups necessary for water-solubility, is treated with a chromium- or cobalt-yielding agent during or after its formation in substance or after its formation on the fiber.

A procedure which may be adopted is to couple 1 mol of the diazo compound of an aromatic amine of the formula

(II)

wherein $R_1$ has the above-cited meaning and $y_1$ represents hydrogen or a hydroxy or thiol group, a substituent convertible into an amino group which may be monosubstituted, or a group combined directly or through —O—, —S—, —NH— or N (possibly substituted alkyl), which contains at least one radical of the formula

wherein Hal stands for chlorine or bromine, with 1 mol of a monoazo compound which may contain chromium or cobalt and has the formula

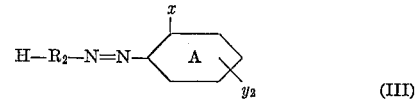

(III)

wherein $x$, $R_2$ and A have the aforecited meanings, and $y_2$ represents hydrogen or a hydroxy or thiol group, a substituent convertible into an amino group which may be monosubstituted or a group combined directly or through —O—, —S—, —NH— or N (possibly substituted alkyl), which contains at least one radical of the formula

wherein Hal stands for chlorine or bromine.

At least one of the radicals $y_1$ or $y_2$ must be different from hydrogen. The disazo dyestuff obtained, which must contain at least the number of solubilizing groups necessary for water-solubility, when $y_1$ and/or $y_2$ stand for a hydroxy or thiol group or a substituent convertible into an amino group which may be monosubstituted, is reacted, if necessary after conversion of the substituent or substituents $y_1$ and/or $y_2$ into an amino group, with a compound which bears at least two radicals of the formula

wherein Hal stands for chlorine or bromine, and treated with a chromium- or cobalt-yielding agent during or after its formation in substance or after its formation on the fiber.

Another procedure which may be adopted is to couple 1 mol of the diazo compound of an aminobenzene of the formula

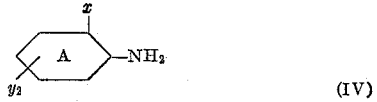

(IV)

wherein $x$, $y_2$ and A have the aforecited meanings, with 1 mol of a monoazo compound of the formula

wherein $y_1$, $R_1$ and $R_2$ have the above-cited meanings, and to treat in the way already described the disazo dyestuff obtained, which must contain at least the number of solubilizing groups necessary for water-solubility.

The metallizable reactive dyestuffs and their chromium or cobalt complex compounds obtainable by the two operating procedures of the process correspond in the metal-free state to Formula I. The substituents, which the radicals A, $R_1$ and $R_2$ may contain according to the given definition, are the sulfonic acid group, an alkylsulfonyl group which may be substituted on the nitrogen atom (amide, methylamide, ethylamide, dimethylamide, diethylamide, 2-hydroxyethylamide, di-(2-hydroxyethyl)-amide, 2- or 3-hydroxypropylamide, 3-methoxypropylamide, 3- or 4-methoxybutylamide, 2-ethoxyethylamide, phenylamide, 2-, 3- or 4-methyl-, -methoxy-, -ethoxy-, or -(chlorophenylamide, N-methyl-N-phenylamide, N-2-hydroxyethyl - N - phenylamide, benzylamide, cyclohexylamide), or halogen atoms (chlorine, bromine atoms), lower alkyl or alkoxy groups (methyl, methoxy, ethoxy), nitro groups and acylamino groups (acetyl-, propionyl-, benzoyl-, carbomethoxy-, carbethoxyamino groups).

As compounds which contain at least two radicals of the formula

wherein Hal stands for chlorine or bromine, the following heterocyclic compounds are suitable: tetrameric chloro- or bromocyan, cyanuric chloride, cyanuric bromide, primary condensation products of a cyanuric halide of the composition

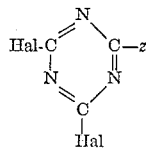

wherein Hal represents chlorine or bromine, and z represents the radical of a primary or secondary aliphatic, alicyclic, aromatic or heterocyclic amine, or of an aliphatic, alicyclic, aromatic or heterocyclic hydroxy or thiol compound, which radical may be substituted, or more especially the radical of aniline, its alkyl or sulfonic acid or carboxylic acid derivatives, of low mono- and dialkylamines and the radical of ammonia, further 2,4,6-trichloropyrimidine and 2,4,6-tribromopyrimidine and their derivatives which contain in the 5-position, for example, the following substituents: methyl, ethyl, carboxylic acid amid or sulfonic acid amide which may be substituted on the nitrogen atom, carboxylic acid methyl or ethyl ester, acyl, e.g. benzoyl, alkenyl, e.g. allyl, chlorovinyl, alkyl which may be substituted, e.g. carboxymethyl, chloro- or bromomethyl and and a methylene group between two pyrimidine nuclei, 2,4,5,6-tetrachloro- or tetrabromopyrimidine, 2,6-dichloro- or -dibromopyrimidine-4-carboxylic acid ethyl ester, 2,4,5-trichloropyrimidine, the 4- or 5-carboxylic acid amide or sulfonic acid amide derivatives of 2,6-dichloro- or -dibromopyrimidine, 2,5,6-trichloro-4-methylpyrimidine, 2,4-dichloro-5-chloromethyl-6-methylpyrimidine and 2,6-dichloro-4-trichloromethylpyrimidine.

The introduction of a dihalogeno-cyanuric radical is carried out to best advantage in aqueous medium at about 0° C. and at a weakly acid reaction, e.g. at a pH value between 3 and 5. The cyanuric halide is used as such in solid form or dissolved in an organic solvent, e.g. acetone. For the primary condensation products of a cyanuric halide a temperature of 30–60° C. and a pH value of 4–6 are best, while for di-, tri- and tetrahalogenopyrimidines temperatures between 40° and 100° C. are the most suitable.

In view of the volatility in steam of certain halogenopyrimidines it is sometimes advisable to work with vessels fitted with reflux condensers. The reaction is so conducted that only one halogen atom reacts with an exchangeable hydrogen atom.

The reaction is carried out in weakly alkaline, neutral to weakly acid medium, but preferably within the pH region of 9 to 3. To neutralize the hydrogen halide which is formed, an acid-binding agent such as sodium acetate is added to the reaction solution at the beginning of the reaction, or small portions of sodium or potassium carbonate or bicarbonate in solid, powdered form or as an aqueous solution are added during the reaction.[1] The addition of small amounts of a wetting or emulsifying agent to the reaction mixture may accelerate the rate of reaction. The coupling of the diazo compounds of the amines of Formulae II and IV with the coupling components is carried out in acid, neutral to alkaline medium at temperatures of 0–30° C.

[1] Aqueous sodium or potassium hydroxide solutions are also well suited as neutralizing agents.

The conversion of the monoazo compounds or the disazo dyestuffs into their chromium or cobalt complex compounds is carried out advantageously in aqueous solution or in organic medium, for example in formamide, or in the concentrated aqueous solution of an alkali-metal salt of a low molecular aliphatic monocarboxylic acid. It is advantageous to allow an amount of a chromium- or cobalt-yielding agent containing less than two but at least one metal atom to act upon two molecules of the monoazo compound or disazo dyestuff. Suitable compounds of chromium are e.g. chromic fluoride, chromic sulfate, chromic formate, chromic acetate, potassium chromic sulfate or ammonium chromic sulfate. The chromates, e.g. sodium or potassium chromate or bichromate, are also highly suitable for metallization.

In this case it is advantageous to work in strongly caustic alkaline medium to which reducing substances may be added if necessary.

As cobalt compounds may be used e.g. cobaltous formate, cobaltous acetate and cobaltous sulfate. When metallization is carried out in the concentrated aqueous solution of an alkali-metal salt of a low molecular aliphatic monocarboxylic acid, water-insoluble metal compounds may also be used, for example cobalt hydroxide and cobalt carbonate.

Metallization is carried out with great advantage in aqueous or alkaline medium, to which the metal compounds are added in presence of compounds such as tartaric acid, citric acid or lactic acid which maintain the metals dissolved in complex combination in caustic alkaline medium.

The organic metallizing solution is poured into brine if desired, after which the resulting metal complex compounds are precipitated from aqueous medium by the addition of salt, then filtered off, washed if necessary and dried.

The metal-containing azo dyestuffs obtained are homogeneous metal complex compounds in which essentially one metal atom is combined with two molecules of disazo dyestuff. The metal complex compounds are so-called 1:2 complexes, wherein one molecule of disazo dyestuff is combined with about 0.3–0.7 metal atom.

The new reactive dyestuffs and their chromium and cobalt complex compounds are very suitable for the padding and printing of wool, silk, leather, synthetic polyamide fibers and fibers of natural or regenerated cellulose, on which they give brown shades.

The dyeings, paddings and prints obtained, which if necessary may be subjected to an alkaline aftertreatment at a high temperature and subsequently soaped, possess good fastness to light, washing, milling, perspiration, rubbing, alkali, crease-resistant finishing and dry cleaning. When the dyestuffs have been applied in the metal-free form, they are afterchromed on the fiber and then possess the same good fastness properties.

In the following examples the parts and percentages are by weight and the temperatures in degrees centigrade.

*Example 1*

22.4 parts of 2-amino-4-chloro-1-hydroxybenzene-6-sulfonic acid are stirred into 90 parts of water with 15 parts of 30% hydrochloric acid and diazotized at 0–5° with a solution of 7 parts of sodium nitrite in 25 parts of water. The diazo suspension is run into a solution of 11 parts of 1,3-dihydroxybenzene and 22 parts of sodium carbonate in 100 parts of water at a temperature of 0–5°. The coupling is completed after 3 hours stirring. The dyestuff is completely precipitated by the addition of sodium chloride, then filtered off and washed with sodium chloride solution.

The filtercake is suspended in 150 parts of water at 70°, and a solution of 16 parts of cobalt sulfate in 40 parts of water is added dropwise in 30 minutes at 70–75°. The pH-value is maintained at 5–6 by the simultaneous dropwise addition of dilute sodium carbonate solution.

After the cobalt sulfate solution has been added, the solution is stirred for 1 hour at 70°. The cobalt complex compound is precipitated with sodium chloride, filtered off and washed with sodium chloride solution. 36.8 parts of 1 - amino - 3 - [2',5',6' - trichloropyrimidyl-(4')-amino]-benzene-6-sulfonic acid are dissolved in 320 parts of water at 60°. The solution is cooled to 5° by the addition of ice, 25 parts of 30% hydrochloric acid are added and then a solution of 7 parts of sodium nitrite in 25 parts of water in 30 minutes. The diazo suspension obtained is added to the solution of the cobalt complex compound described above in 300 parts of water in 15 minutes at a temperature of 0–5°. To maintain the pH value of the coupling mass at 8.0–8.5, sodium carbonate is strewn in. After 3 hours' stirring coupling is completed. The cobalt complex compound of the disazo dyestuff is completely precipitated by the addition of sodium chloride, then filtered off and washed with sodium chloride solution. The dyestuff, dried with vacuum, is obtained as a dark powder, which dissolves in water with a dark brown coloration. Mercerized cotton sateen is printed with a printing paste of the following composition:

- 30 parts of the dyestuff obtained according to the particulars given above
- 100 parts of urea
- 372 parts of water
- 450 parts of a 3% sodium alginate thickening
- 15 parts of sodium 1-nitrobenzene-3-sulfonate
- 33 parts of sodium carbonate 1000 parts The dried fabric is steamed for 10–15 minutes at 102–104° and subsequently rinsed in cold and warm water. After soaping at the boil and subsequent rinsing and drying, a bright print of good wet and light fastness is obtained.

*Example 2*

23.4 parts of 2-amino-4-amino-4-nitro-1-hydroxybenzene-6-sulfonic acid are stirred into 80 parts of water with 15 parts of 30% hydrochloric acid and diazotized with a solution of 7 parts of sodium nitrite in 25 parts of water at 0–5°. The diazo solution is adjusted with sodium carbonate to react neutral to Congo red indicator paper and subsequently added to a solution of 22 parts of 1.3-dihydroxybenzene and 44 parts of sodium carbonate in 200 parts of water at a temperature of 0–5°. After stirring for 1 hour the coupling reaction is completed. The dyestuff is completely precipitated by the addition of sodium chloride, then filtered off and washed with sodium chloride solution until no more 1.3-dihydroxybenzene is indicated in the filtrate.

The filtercake is stirred into 200 parts of water at 90°. 30 parts of crystallized sodium acetate and 30 parts of crystallized chromium potassium sulfate are added to the dyestuff suspension, and the mixture heated for 12 hours with reflux. The chromium complex compound is precipitated with sodium chloride, filtered off and washed with sodium chloride solution. 39.2 parts of sodium 1-amino - 3 - [2',5',6' - trichloropyrimidyl - (4') - amino-] benzene-6-sulfonate are dissolved in 320 parts of water at 60°. To the solution, cooled to 5° with ice, are added 25 parts of 30% hydrochloric acid and then in 30 minutes a solution of 7 parts of sodium nitrite in 25 parts of water. The diazo suspension obtained is added to the solution of the above-described chromium complex compound in 400 parts of water, over 15 minutes at 0–5°. The pH value of the coupling mass is maintained at 8.0–8.5 by strewing in sodium carbonate. After 1 hour's stirring the coupling reaction is completed. The chromium complex compound of the disazo dyestuff is precipitated completely by the addition of sodium chloride, filtered off and washed with sodium chloride solution. The dyestuff is dried with vacuum and is obtained as a dark powder which dissolves in water with a dark brown coloration.

Cotton cretonne is printed with a printing paste of the following composition:

- 30 parts of the dyestuff obtained according to the particulars given above
- 100 parts of urea
- 372 parts of water
- 450 parts of a 3% sodium alginate thickening
- 15 parts of sodium 1-nitrobenzene-3-sulfonate
- 33 parts of sodium carbonate 1000 parts The dried fabric is steamed for 10–15 minutes at 102–104° and subsequently rinsed in cold and warm water. After soaping at the boil and subsequent rinsing and drying, a reddish brown print of good wet and light fastness is obtained.

*Example 3*

39.2 parts of sodium 1-amino-3-[2',5',6'-trichloropyrimidyl-(4')-amino-] benzene-6-sulfonate are dissolved in 320 parts of water at 60°. To the solution, cooled to 5° with ice, are added 25 parts of 30% hydrochloric acid and then in 30 minutes a solution of 7 parts of sodium nitrite in 25 parts of water. A dispersion of 24 parts of 2-amino-5-hydroxynaphthalene-7-sulfonic acid in 200 parts of water is added to this suspension and the pH value of the coupling mass adjusted to 3.5 by the addition of sodium acetate solution. After stirring for 12 hours at 10° coupling is completed. The dyestuff is completely precipitated by the addition of sodium chloride, filtered off and washed with sodium chloride solution.

The filtercake is stirred into 350 parts of water and the pH adjusted to 8.5 by the addition of sodium carbonate. A diazo solution of 23.4 parts of 2-amino-4-nitro-1-hydroxybenzene-6-sulfonic acid, prepared as given in Example 2, is then added dropwise, the pH value of the coupling mass being maintained at 8.5–9 by the addition of sodium carbonate solution. After stirring for 12 hours the disazo dyestuff is precipitated by acidification with 30% hydrochloric acid, filtered off and washed with sodium chloride solution. The filtercake is suspended in 400 parts of water at 70° and at a pH value of 5. Over 30 minutes a solution of 16 parts of cobaltous sulfate in 40 parts of water is added dropwise at 70–75°. The pH value is maintained between 5 and 6 by the simultaneous dropwise addition of a dilute sodium carbonate solution. After the cobalt sulfate solution has been added the mixture is stirred further for 1 hour at 70°. The cobalt complex compound is precipitated by the addition of sodium chloride, filtered off and washed with sodium chloride solution. The dyestuff is dried with vacuum and is obtained as a dark powder which dissolves in water with a dark brown coloration.

A fabric of viscose staple fiber is printed with a printing paste of the following composition:

- 30 parts of the dyestuff obtained according to the particulars given above
- 200 parts of urea
- 272 parts of water
- 450 parts of a 4% sodium alginate thickening
- 15 parts of sodium 1-nitrobenzene-3-sulfonate
- 33 parts of sodium carbonate 1000 parts The dried goods are exposed to dry heat for 1 minute at 200° or 10 minutes at 120°, subsequently rinsed in cold and warm water and soaped at the boil. After further rinsing and drying a brown print of good wet and light fastness is obtained.

*Example 4*

To a neutral solution of 23 parts of 1-amino-3-acetylaminobenzene-6-sulfonic acid in 200 parts of water and 13.4 parts of 30% sodium hydroxide solution is added a solution of 7 parts of sodium nitrite in 25 parts of water. The whole is then added dropwise over 30 minutes to 25 parts of 30% hydrochloric acid in 100 parts of ice-water at 0–5°. This diazo suspension is then run into a suspension of 34.1 parts of the monoazo dyestuff, obtained according to the particulars given in the first paragraph of Example 2, in 250 parts of water at 5°, and the pH value of the coupling mass held at 8.5–9.0 by the addition of sodium carbonate. After stirring for 8 hours at 5–10° the coupling reaction is completed. The disazo dyestuff is completely precipitated with sodium chloride, filtered off and washed with sodium chloride solution. The filtercake is stirred into 400 parts of a 5% sodium hydroxide solution and maintained for 1 hour at 95°. The deacetylated disazo dyestuff is precipitated by the addition of sodium chloride, filtered with suction and washed with sodium chloride solution.

The filtercake is suspended in 400 parts of water, reacted with a cobalt-yielding agent and isolated according to the particulars given in Example 1.

The cobalt complex compound thus obtained is dissolved in 300 parts of water and then at a temperature of 0° 18.5 parts of cyanuric chloride are added. The pH value of the reaction mixture is maintained at 3–4 by the dropwise addition of dilute sodium carbonate solution. After stirring for 3 hours at 0° condensation is completed. The dyestuff is precipitated by the addition of sodium chloride and filtered off. On drying with vacuum it is obtained as a dark powder which dissolves in water to given brown solutions.

For Vigoureux printing on cotton a printing paste of the following composition is used:

30 parts of the dyestuff obtained according to the particulars given above
200 parts of urea
565 parts of water
200 parts of 3% sodium alginate thickening
5 parts of a highly sulfonated castor oil 1000 parts The goods are steamed for 2 periods of 45 minutes each with intermediate cooling.

The following table shows further chromium- and cobalt-containing reactive dyestuffs which are obtainable according to the particulars of Examples 1 to 4

| Ex. No. | Diazo Component 1 (I) | Coupling Component (II) | Diazo Component 2 (III) | Reactive System (IV) | Metal (V) | Shade (VI) |
|---|---|---|---|---|---|---|
| 5 | 1,3-diaminobenzene-6-sulfonic acid. | 1,3-dihydroxybenzene. | 2-amino-1-hydroxybenzene-4-sulfonic acid. | 2,4,5,6-tetrachloropyrimidine. | Cr | Reddish brown. |
| 6 | ...do... | ...do... | 2-amino-4-chloro-1-hydroxybenzene-6-sulfonic acid. | 2,4,6-trichloropyrimidine. | Cr | Do. |
| 7 | ...do... | ...do... | 2-amino-1-hydroxybenzene-4-sulfonic acid. | ...do... | Co | Do. |
| 8 | ...do... | ...do... | 2-amino-6-nitro-1-hydroxybenzene-4-sulfonic acid. | 2,4,5,6-tetrachloropyrimidine. | Co | Do. |
| 9 | ...do... | ...do... | ...do... | ...do... | Cr | Do. |
| 10 | ...do... | ...do... | ...do... | ...do... | Co | Do. |
| 11 | ...do... | ...do... | ...do... | Cyanuric chloride. | Co | Do. |
| 12 | ...do... | ...do... | 2-amino-4-nitro-1-hydroxybenzene-6-sulfonic acid. | 2,4,5,6-tetrachloropyrimidine. | Co | Do. |
| 13 | ...do... | ...do... | 2-amino-1-hytroxybenzene-4,6-disulfonic acid. | Cyanuric chloride. | Cr | Do. |
| 14 | ...do... | ...do... | ...do... | 2,4,6-tribromopyrimidine. | Cr | Red-brown. |
| 15 | ...do... | ...do... | 2-amino-1-hydroxybenzene-4-sulfonic acid. | 2,4,5,6-tetrachloropyrimidine. | Cr | Reddish brown. |
| 16 | ...do... | ...do... | 2-amino-1-hydroxybenzene-4-sulfonic acid amide. | ...do... | Co | Brown. |
| 17 | 2,6-diamino-naphthalene-4,8-disulfonic acid. | ...do... | 2-amino-1-hydroxybenzene-4-sulfonic acid. | 2,4-dichloro-6-(2'-hydroxy)-ethylamino-1,3,5-triazine. | Co | Do. |
| 18 | ...do... | ...do... | ...do... | 2,4-dichloro-6-amino-1,3,5-triazine. | Cr | Reddish brown. |
| 19 | ...do... | ...do... | 2-amino-4-chloro-1-hydroxybenzene-6-sulfonic acid. | 2,4,6-trichloropyrimidine. | Cr | Do. |
| 20 | ...do... | ...do... | ...do... | 2,4,5,6-tetrabromopyrimidine. | Co | Brown. |
| 21 | ...do... | ...do... | 2-amino-6-chloro-1-hydroxybenzene-4-sulfonic acid. | ...do... | Co | Do. |
| 22 | ...do... | ...do... | ...do... | 2,4-dichloro-6-ethylamino-1,3,5-triazine-2'-sulfonic acid. | Cr | Reddish brown. |
| 23 | ...do... | ...do... | 2-amino-4-nitro-1-hydroxybenzene-6-sulfonic acid. | 2,4,5,6-tetrachloropyrimidine. | Cr | Do. |
| 24 | ...do... | ...do... | ...do... | ...do... | Co | Brown. |
| 25 | ...do... | ...do... | 2-amino-6-nitro-1-hydroxybenzene-4-sulfonic acid. | Cyanuric bromide. | Co | Do. |
| 26 | ...do... | ...do... | ...do... | 2,4,6-trichloropyrimidine. | Cr | Reddish brown. |
| 27 | 4.4'-diamino-1.1'-diphenyl-3-sulfonic acid. | ...do... | 2-amino-1-hydroxybenzene-4,6-disulfonic acid. | 2,4-dichloro-6-carboxymethylamino-1,3,5-triazine. | Co | Brown. |
| 28 | ...do... | ...do... | ...do... | 2,4-dichloro-6-phenylamino-1,3,5-triazine-3'-sulfonic acid. | Cr | Reddish brown. |
| 29 | ...do... | ...do... | 2-amino-4-chloro-1-hydroxybenzene-6-sulfonic acid. | 2,4-dichloro-5-chloromethyl-6-methyl-pyrimidine. | Cr | Do. |
| 30 | ...do... | ...do... | ...do... | Cyanuric chloride. | Co | Brown. |
| 31 | ...do... | ...do... | 2-amino-6-chloro-1-hydroxybenzene-4-sulfonic acid. | 2,4-dibromo-6-phenylamino-1,3,5-triazine-4'-sulfonic acid. | Co | Do. |
| 32 | ...do... | ...do... | ...do... | 2,4-dichloro-6-phenylamino-1,3,5,-triazine-2'-carboxylic acid. | Cr | Reddish brown. |
| 33 | ...do... | ...do... | 2-amino-4-nitro-1-hydroxybenzene-6-sulfonic acid. | 2,5,6-trichloro-4-methyl-pyrimidine. | Cr | Do. |
| 34 | ...do... | ...do... | ...do... | 2,4,6-trichloropyrimidine. | Co | Brown. |
| 35 | ...do... | ...do... | 2-amino-6-nitro-1-hydroxybenzene-4-sulfonic acid. | ...do... | Co | Do. |
| 36 | ...do... | ...do... | ...do... | Cyanuric chloride. | Cr | Reddish brown. |
| 37 | 1-aminobenzene-4-sulfonic acid. | ...do... | 2,6-diamino-1-hydroxybenzene-4-sulfonic acid. | 2,4,5,6-tetrachloro-pyrimidine. | Cr | Do. |
| 38 | 1-aminobenzene-3-sulfonic acid. | ...do... | ...do... | ...do... | Co | Brown. |

| Ex. No. | Diazo Component 1 (I) | Coupling Component (II) | Diazo Component 2 (III) | Reactive System (IV) | Metal (V) | Shade (VI) |
|---|---|---|---|---|---|---|
| 39 | 1,3-diaminobenzene-6-sulfonic acid. | 1-amino-3-hydroxybenzene. | 2-amino-1-hydroxybenzene-4-sulfonic acid. | 2,4-dichloro-6-di-(β-hydroxyethyl)-amino-1,3,5-triazine. | Co | Brown. |
| 40 | ----do---- | ----do---- | ----do---- | 2,4,6-trichloropyrimidine. | Cr | Reddish brown. |
| 41 | ----do---- | ----do---- | 2-amino-4-nitro-1-hydroxybenzene-6-sulfonic acid. | 2,4,5,6-tetrabromopyrimidine. | Co | Do. |
| 42 | ----do---- | ----do---- | ----do---- | ----do---- | Cr | Do. |
| 43 | ----do---- | ----do---- | 2-amino-4-chloro-1-hydroxybenzene-6-sulfonic acid. | ----do---- | Cr | Do. |
| 44 | ----do---- | ----do---- | 2-amino-1-hydroxybenzene-4-sulfonic acid (N-3'-methoxy)-propylamide. | 2,4,5-trichloropyrimidine. | Cr | Do. |
| 45 | ----do---- | ----do---- | ----do---- | 2,4-dichloro-6-N-methyl-N-ethyl-amino-1,3,5-triazine-2'-sulfonic acid. | Co | Do. |
| 46 | ----do---- | 1,3-diaminobenzene. | 2-amino-4-nitro-1-hydroxybenzene-6-sulfonic acid. | 2,4,5,6-tetrachloropyrimidine. | Cr | Do. |
| 47 | ----do---- | ----do---- | 2-amino-6-nitro-1-hydroxybenzene-4-sulfonic acid. | ----do---- | Cr | Do. |
| 48 | ----do---- | ----do---- | 2-amino-4-chloro-1-hydroxybenzene-6-sulfonic acid. | Cyanuric chloride. | Cr | Do. |
| 49 | ----do---- | ----do---- | 2-amino-6-chloro-1-hydroxybenzene-4-sulfonic acid. | 2,4,5,6-tetrabromopyrimidine. | Cr | Do. |
| 50 | ----do---- | ----do---- | 2-amino-1-hydroxybenzene-4-sulfonic acid. | 2,4,6-trichloropyrimidine. | Cr | Do. |
| 51 | ----do---- | 2-amino-5-hydroxynaphthalene-7-sulfonic acid. | 2-amino-4-nitro-1-hydroxybenzene-6-sulfonic acid. | ----do---- | Cr | Violettish brown. |
| 52 | ----do---- | ----do---- | 2-amino-6-nitro-1-hydroxybenzene-4-sulfonic acid. | 2,4,5,6-tetrachloropyrimidine. | Co | Reddish brown. |
| 53 | ----do---- | ----do---- | 2-amino-4-chloro-1-hydroxybenzene-6-sulfonic acid. | ----do---- | Co | Do. |
| 54 | ----do---- | ----do---- | 2-amino-6-chloro-1-hydroxybenzene-4-sulfonic acid. | 2,4,6-trichloropyrimidine. | Co | Do. |
| 55 | 1,4-diaminobenzene-2-sulfonic acid. | 1,3-dihydroxybenzene. | 2-amino-4-chloro-1-hydroxybenzene-6-sulfonic acid. | ----do---- | Co | Brown. |
| 56 | 1,3-diaminobenzene-6-sulfonic acid. | ----do---- | 2-amino-6-acetylamino-1-hydroxybenzene-4-sulfonic acid. | ----do---- | Co | Do. |
| 57 | ----do---- | ----do---- | 2-amino-6-methyl-1-hydroxybenzene-4-sulfonic acid. | 2,4,5,6-tetrachloropyrimidine. | Co | Do. |
| 58 | ----do---- | ----do---- | ----do---- | 2,4-dichloro-5-chloromethyl-6-methylpyrimidine. | Co | Do. |
| 59 | 3-amino-1-(hydroxymethyl)-benzene. | ----do---- | 2-amino-1-hydroxybenzene-4.6-disulfonic acid. | 2,4,6-trichloropyrimidine. | Co | Do. |
| 60 | 1,3-diaminobenzene-6-sulfonic acid. | 1-amino-8-hydroxynaphthalene-3.6-disulfonic acid. | 2-amino-1-hydroxybenzene-4-sulfonic acid methylamide. | 2,4-dichloro-6-methyl-amino-1,3,5-triazine. | Co | Violet-brown. |
| 61 | ----do---- | 2-methylamino-5-hydroxynaphthalene-7-sulfonic acid. | 2-amino-4-nitro-1-hydroxybenzene-6-sulfonic acid. | 2,4-dichloro-6-ethylamino-1,3,5-triazine. | Co | Violettish brown. |
| 62 | ----do---- | 2-phenylamino-5-hydroxynaphthalene-7-sulfonic acid. | ----do---- | 2,4,6-trichloropyrimidine. | Co | Do. |
| 63 | 1,4-diaminobenzene-2-sulfonic acid. | 1,3-dihydroxy-4-chlorobenzene. | 2-amino-4-chloro-1-hydroxybenzene-6-sulfonic acid. | 2,4-dichloro-6-(3'-hydroxy)-propylamino-1,3,5-triazine. | Co | Brown. |
| 64 | ----do---- | 1,3-dihydroxy-4-methylbenzene. | ----do---- | 2,4-dichloro-6-(3'-methoxy)-propylamino-1,3,5-triazine. | Co | Do. |
| 65 | ----do---- | 1,3-dihydroxybenzene. | 2-amino-1-hydroxybenzene-4-sulfonic acid ethylamide. | 2,4-dichloro-6-dimethyl-amino-1,3,5-triazine. | Co | Do. |
| 66 | ----do---- | ----do---- | 2-amino-1-hydroxybenzene-4-sulfonic acid (2'-hydroxy)-ethylamide. | 2,4,5,6-tetrachloropyrimidine. | Co | Do. |
| 67 | ----do---- | ----do---- | 2-amino-1-hydroxybenzene-4-sulfonic acid-(3'-hydroxy)-propylamide. | ----do---- | Co | Do. |
| 68 | ----do---- | ----do---- | 2-amino-1-hydroxybenzene-4-sulfonic acid (2'-ethoxy)-ethylamide. | ----do---- | Co | Do. |
| 69 | ----do---- | ----do---- | 2-amino-1-carboxybenzene-5-sulfonic acid. | 2,4-dichloro-6-di-(3'-hydroxypropyl)-amino-1,3,5-triazine. | Cr | Do. |
| 70 | ----do---- | ----do---- | 2-amino-1-hydroxybenzene-5-sulfonic acid. | 2,4,6-trichloropyrimidine. | Co | Do. |
| 71 | 1,3-diaminobenzene-6-sulfonic acid. | 1,3-diamino-4-chlorobenzene. | 2-amino-1-hydroxybenzene-4-sulfonic acid. | 2,4,5,6-tetrachloropyrimidine. | Co | Do. |
| 72 | ----do---- | 1,3-diamino-4-methylbenzene. | ----do---- | ----do---- | Co | Do. |
| 73 | ----do---- | 1,3-dihydroxybenzene. | 2-amino-1-carboxybenzene-5-sulfonic acid. | ----do---- | Cr | Do. |
| 74 | ----do---- | ----do---- | 2-amino-1-carboxybenzene. | 2,4-dichloro-6-ethylamino-1,3,5-triazine-2'-sulfonic acid. | Cr | Do. |
| 75 | 1-aminonaphthalene-4-sulfonic acid. | ----do---- | 2,6-diamino-1-hydroxybenzene-4-sulfonic acid. | ----do---- | Co | Do. |
| 76 | 1-aminobenzene-2-sulfonic acid. | ----do---- | ----do---- | 2,4,6-trichloropyrimidine. | Co | Do. |
| 77 | 1-aminonaphthalene-3,6-disulfonic acid. | ----do---- | ----do---- | ----do---- | Co | Do. |
| 78 | ----do---- | ----do---- | 2,6-diamino-1-hydroxybenzene-4-sulfonic acid. | Cyanuric chloride. | Co | Do. |
| 79 | 2-aminonaphthalene-4,8-disulfonic acid. | ----do---- | ----do---- | 2,4-dichloro-6-amino-1,3,5-triazine. | Co | Do. |
| 80 | 2-amino-6-acetylaminonaphthalene-4,8-disulfonic acid. | ----do---- | ----do---- | 2,4,5,6-tetrachloropyrimidine. | Co | Do. |
| 81 | 1-aminobenzene-2,4-disulfonic acid. | ----do---- | ----do---- | 2,4,5,6-tetrabromopyrimidine. | Co | Do. |
| 82 | 1-aminobenzene-2,5-disulfonic acid. | ----do---- | ----do---- | 2,4,6-tribromopyrimidine. | Co | Do. |

Formulae of representative dyes of the foregoing examples are as follows:

*Example 1*

The 1:2 cobalt complex compound of

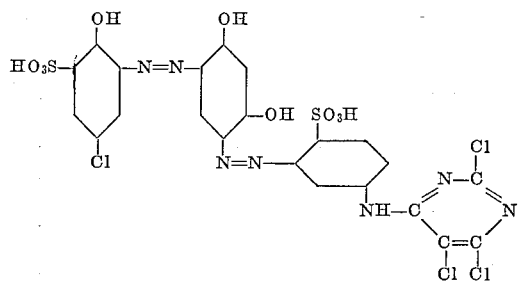

*Example 2*

The 1:2 chromium complex compound of

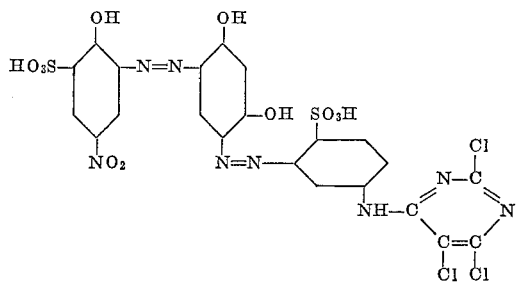

*Example 3*

The 1:2 cobalt complex compound of

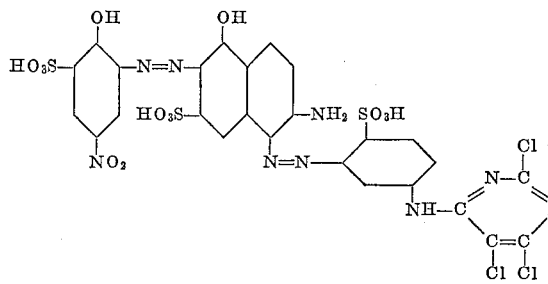

*Example 4*

The 1:2 cobalt complex compound of

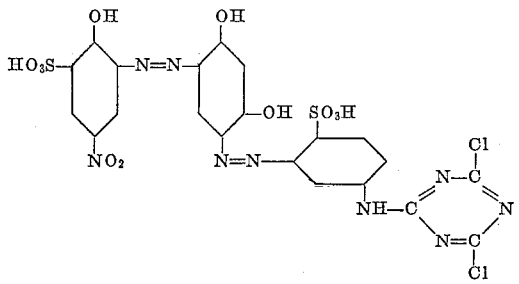

*Example 12*

The 1:2 cobalt complex compound of

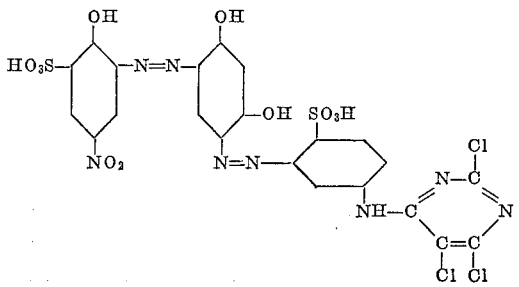

*Example 16*

The 1:2 cobalt complex compound of

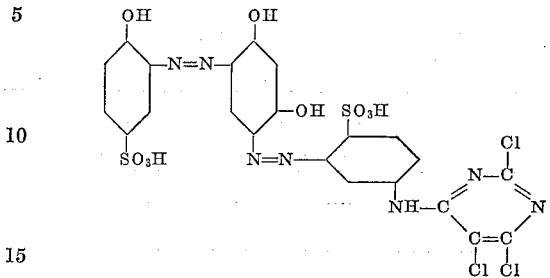

*Example 24*

The 1:2 cobalt complex compound of

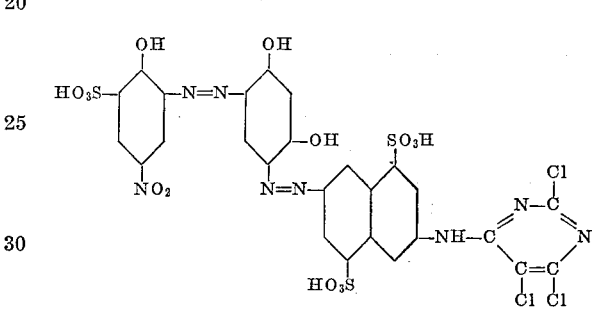

*Example 47*

The 1:2 chromium complex compound of

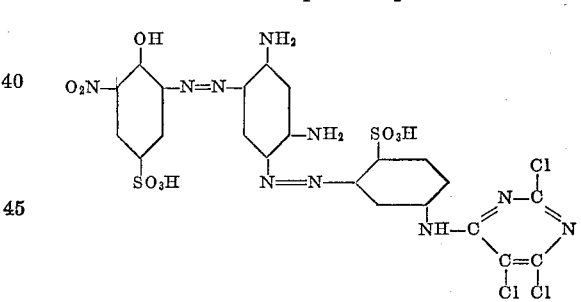

Having thus disclosed the invention what we claim is:
1. A member selected from the group consisting of metallizable disazo dyestuffs of the formula

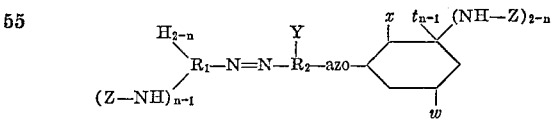

and their 1:2 cobalt and chromium complex compounds, wherein $R_1$ is a member selected from the group consisting of monosulfophenyl, disulfophenyl, monosulfonaphthyl, disulfonaphthyl and monosulfodiphenylyl, $R_2$ is a member selected from the group consisting of meta-dihydroxyphenyl, meta-diaminophenyl, sulfonated amino-hydroxynaphthyl, sulfonated lower alkylamino-hydroxynaphthyl, sulfonated phenylamino-hydroxynaphthyl, $y$ itself being a member selected from the group consisting of hydroxy, amino, lower alkylamino and phenylamino and being in ortho-position to azo, x is a member selected from the group consisting of hydroxy and carboxy, Z is a member selected from the group consisting of
dihalogeno-pyrimidyl-,
dihalogeno-4-methyl-pyrimidyl-,
trihalogeno-pyrimidyl-,
2,4-dihalogeno-6-methyl-pyrimidyl-5-methylene-,
4,6-dihalogeno-1,3,5-triazinyl-2-,
4-halogeno-6-amino-1,3,5-triazinyl-2-,
4-halogeno-6-lower alkylamino-1,3,5-triazinyl-2-,
4-halogeno-6-di(loweralkyl)amino-1,3,5-triazinyl-2-,
4-halogeno-6-lower hydroxyalkylamino-1,3,5-triazinyl-2-,
4-halogeno-6-di-(lower hydroxyalkyl)amino-1,3,5-triazinyl-2-,
4-halogeno-6-lower alkoxyalkylamino-1,3,5-triazinyl-2-,
4-halogeno-6-lower carboxyalkylamino-1,3,5-triazinyl-2-,
4-halogeno-6-lower sulfoalkylamino-1,3,5-triazinyl-2-,
4-halogeno-6-N-lower alkyl-N-lower sulfoalkylamino-1,3,5-triazinyl-2-,
4-halogeno-6-carboxyphenylamino-1,3,5-triazinyl-2- and
4-halogeno-6-sulfophenylamino-1,3,5-triazinyl-2-,
halogen having an atomic weight between 35 and 81, and Z being free from further substituents, t is a member selected from the group consisting of hydrogen, chlorine, methyl, nitro, acetylamino and —SO$_3$H, v is a member selected from the group consisting of hydrogen and —SO$_3$H, and w is a member selected from the group consisting of hydrogen, chlorine, nitro, methyl, —SO$_3$H, sulfonic acid amide, sulfonic acid lower alkylamide, sulfonic acid lower hydroxy-alkylamide and sulfonic acid lower alkoxyalkylamide, n being one of the integers 1 and 2.

2. The 1:2 cobalt complex compound of

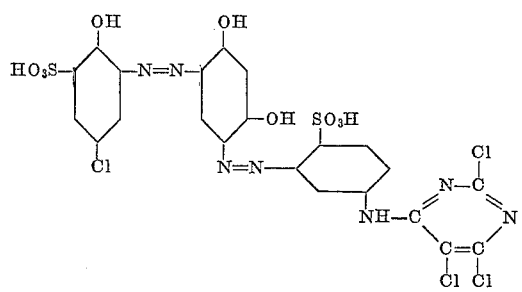

3. The 1:2 cobalt complex compound of

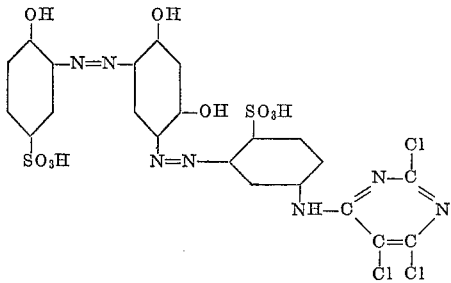

4. The 1:2 cobalt complex compound of

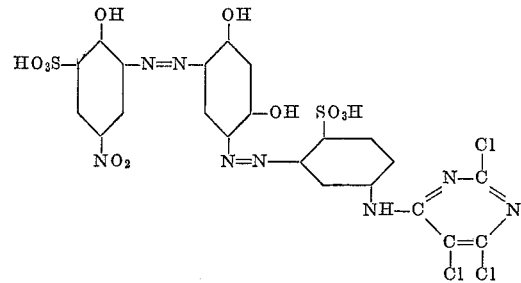

5. The 1:2 cobalt complex compound of

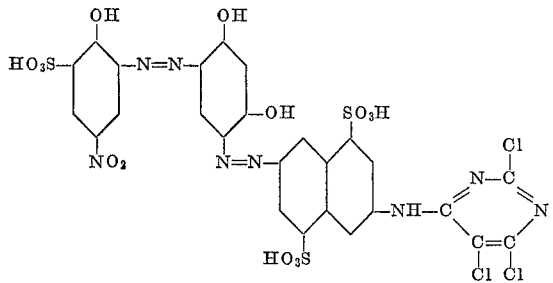

6. The 1:2 chromium complex compound of

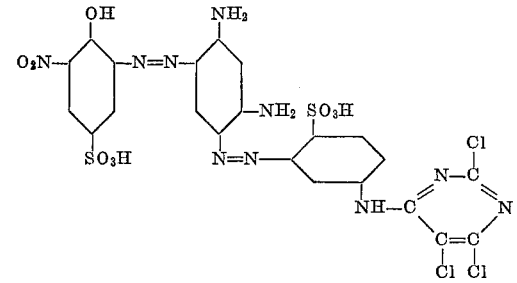

References Cited in the file of this patent
UNITED STATES PATENTS

| | | |
|---|---|---|
| 2,045,090 | Lange et al. | June 23, 1936 |
| 2,935,506 | Heslop et al. | May 3, 1960 |

FOREIGN PATENTS

| | | |
|---|---|---|
| 1,221,621 | France | Jan. 18, 1960 |
| 1,247,660 | France | Oct. 24, 1960 |